(12) United States Patent
Yun et al.

(10) Patent No.: US 11,894,537 B2
(45) Date of Patent: Feb. 6, 2024

(54) BATTERY MODULE AND BATTERY PACK INCLUDING THE SAME

(71) Applicant: LG Energy Solution, Ltd., Seoul (KR)

(72) Inventors: Sunwoo Yun, Daejeon (KR); Minjun Kim, Daejeon (KR); Changbok Lee, Daejeon (KR)

(73) Assignee: LG Energy Solution, Ltd.

( * ) Notice: Subject to any disclaimer, the term of this patent is extended or adjusted under 35 U.S.C. 154(b) by 121 days.

(21) Appl. No.: 17/604,909

(22) PCT Filed: Jun. 30, 2020

(86) PCT No.: PCT/KR2020/008519
§ 371 (c)(1),
(2) Date: Oct. 19, 2021

(87) PCT Pub. No.: WO2021/071055
PCT Pub. Date: Apr. 15, 2021

(65) Prior Publication Data
US 2022/0200083 A1 Jun. 23, 2022

(30) Foreign Application Priority Data
Oct. 10, 2019 (KR) .................. 10-2019-0125309

(51) Int. Cl.
*H01M 10/6572* (2014.01)
*H01M 10/653* (2014.01)
(Continued)

(52) U.S. Cl.
CPC ..... *H01M 10/6572* (2015.04); *H01M 10/653* (2015.04); *H01M 50/507* (2021.01); *H01M 50/536* (2021.01)

(58) Field of Classification Search
CPC .......... H01M 10/6572; H01M 10/653; H01M 50/507; H01M 50/536
See application file for complete search history.

(56) References Cited

U.S. PATENT DOCUMENTS 8,722,222 B2 5/2014 Kossakovski et al.
9,671,142 B2 6/2017 Kossakovski et al.
(Continued)

FOREIGN PATENT DOCUMENTS

CN 106133948 A 11/2016
CN 108886184 A 11/2018
(Continued)

OTHER PUBLICATIONS

Extended European Search Report for Application No. 20873578.7 dated Jul. 8, 2022. 7 pgs.
(Continued)

*Primary Examiner* — Jimmy Vo
(74) *Attorney, Agent, or Firm* — Lerner David LLP

(57) ABSTRACT

The battery module according to one embodiment of the present disclosure includes: a battery cell stack, in which a plurality of battery cells comprising electrode leads, are stacked; busbars connecting the electrode leads; and a temperature control unit that makes contact with the electrode leads. The temperature control unit comprises a heat transfer member that makes contact with the electrode leads and a thermoelectric element capable of being heated and cooled, wherein the heat transfer member comprises a metal layer and a metal oxide layer, the metal oxide layer being located between the metal layer and the electrode leads.

11 Claims, 3 Drawing Sheets

(51) Int. Cl.
　　*H01M 50/507*　　(2021.01)
　　*H01M 50/536*　　(2021.01)

(56) References Cited

U.S. PATENT DOCUMENTS

| | | | |
|---|---|---|---|
| 9,685,599 | B2 | 6/2017 | Petrovski et al. |
| 10,208,990 | B2 | 2/2019 | Petrovski et al. |
| 10,337,770 | B2 | 7/2019 | Kossakovski et al. |
| 2011/0305935 | A1 | 12/2011 | Yoon |
| 2012/0261107 | A1 | 10/2012 | Prinz et al. |
| 2017/0125774 | A1 | 5/2017 | Choi et al. |
| 2017/0170445 | A1 | 6/2017 | Kim et al. |
| 2019/0081293 | A1 | 3/2019 | Hwang |
| 2019/0305281 | A1 | 10/2019 | Hale |
| 2020/0358127 | A1 | 11/2020 | Terauchi et al. |

FOREIGN PATENT DOCUMENTS

| | | | | |
|---|---|---|---|---|
| CN | 109802194 | A | | 5/2019 |
| JP | 2005057006 | A | | 3/2005 |
| JP | 2012227148 | A | | 11/2012 |
| JP | 2013229266 | A | * | 11/2013 |
| JP | 2013229266 | A | | 11/2013 |
| JP | 2019009220 | A | | 1/2019 |
| JP | 2019135706 | A | | 8/2019 |
| KR | 20090091942 | A | | 8/2009 |
| KR | 20110015070 | A | * | 11/2013 |
| KR | 20140039350 | A | | 4/2014 |
| KR | 20140057260 | A | | 5/2014 |
| KR | 20160041257 | A | | 4/2016 |
| KR | 20160049826 | A | | 5/2016 |
| KR | 20160120089 | A | | 10/2016 |
| KR | 20170034560 | A | | 3/2017 |
| KR | 20170034560 | A | * | 3/2017 |
| KR | 20170068370 | A | | 6/2017 |
| KR | 20170113903 | A | | 10/2017 |
| KR | 20190077330 | A | | 7/2019 |
| KR | 20210065268 | A | | 6/2021 |
| WO | 2019146238 | A1 | | 8/2019 |

OTHER PUBLICATIONS

International Search Report for Application No. PCT/KR2020/008519, dated Oct. 8, 2020, 3 pages.

Search Report dated Sep. 11, 2023 from the Office Action for Chinese Application No. 202080030020.7 dated Sep. 13, 2023, pp. 1-3.

* cited by examiner

[FIG. 1]
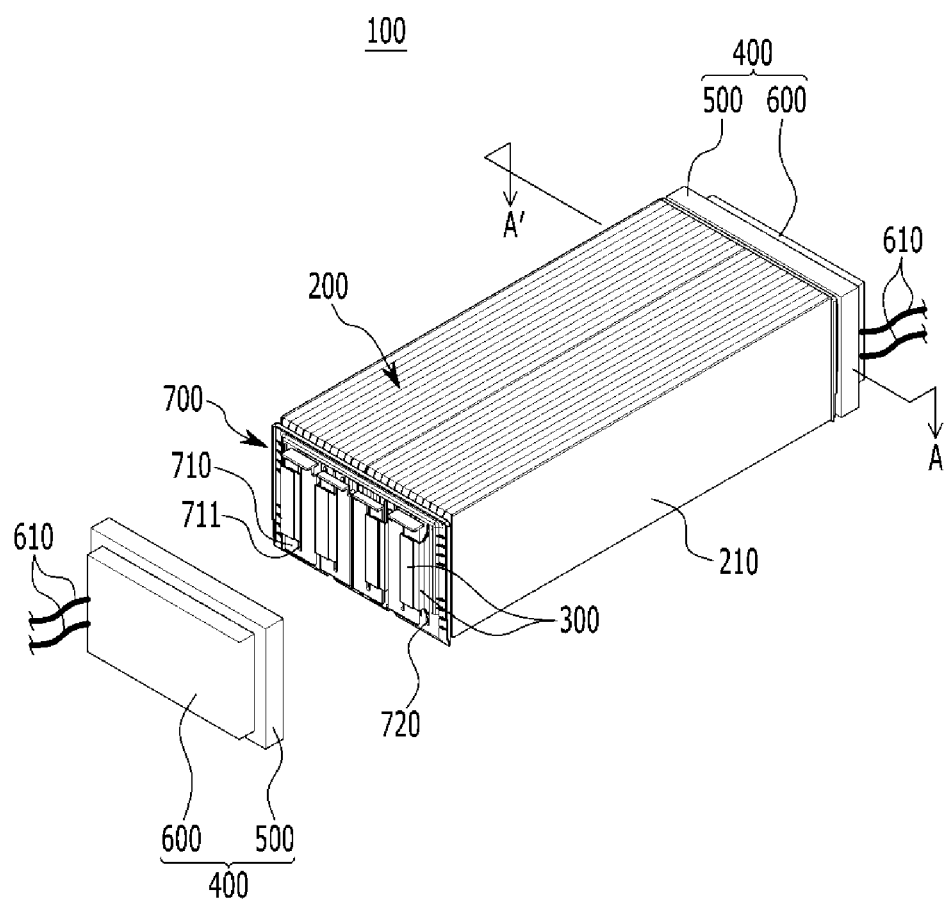

[FIG. 2]
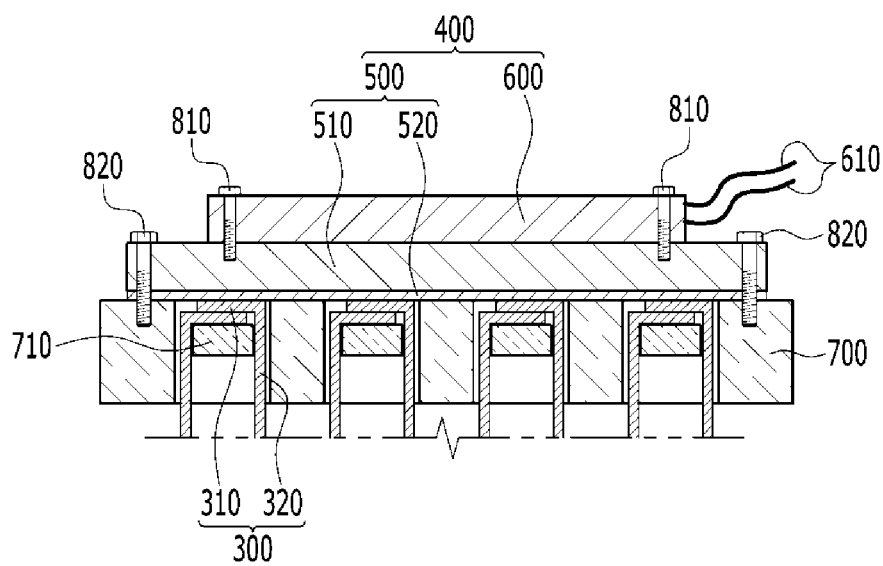
[FIG. 3]
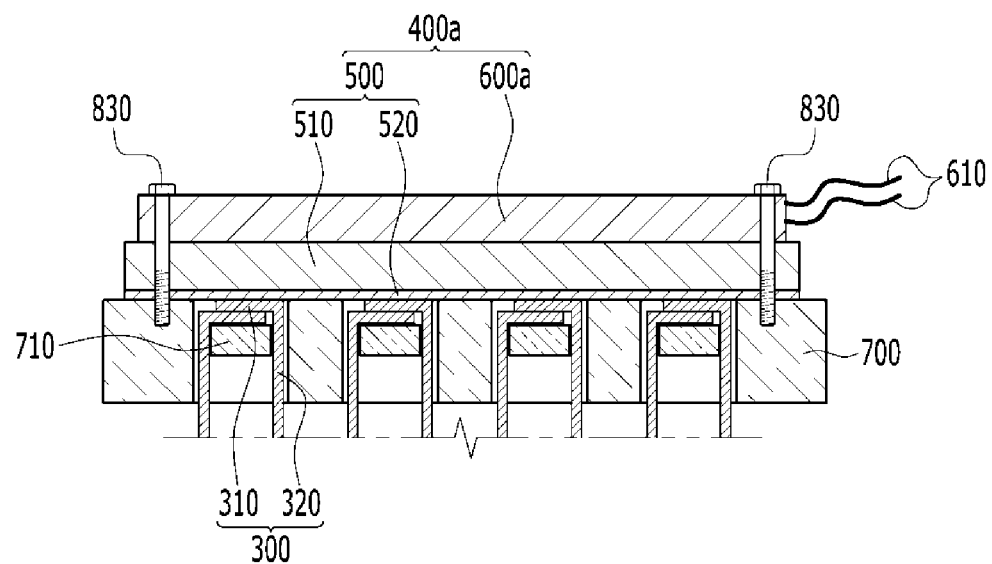

[FIG. 4]
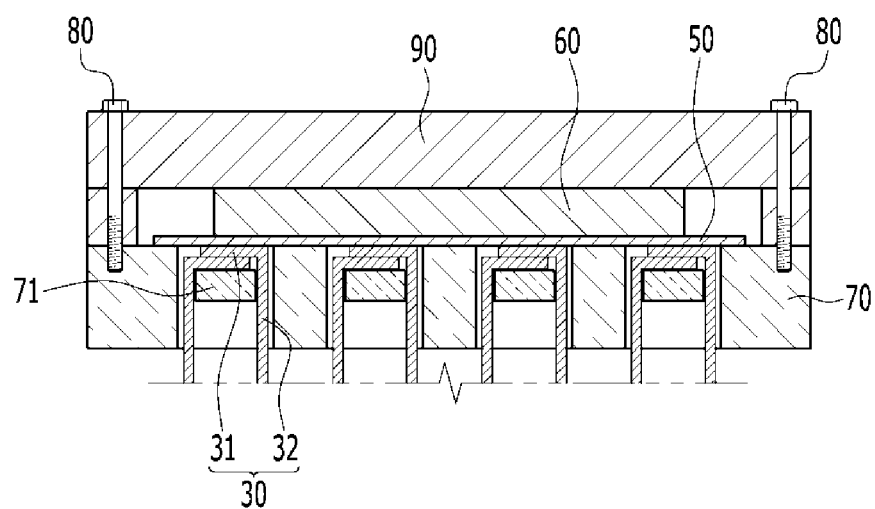

BATTERY MODULE AND BATTERY PACK INCLUDING THE SAME

CROSS-REFERENCE TO RELATED APPLICATIONS

This application is a national phase entry under 35 U.S.C. § 371 of International Application No. PCT/KR2020/008519 filed on Jun. 30, 2020, which claims priority from Korean Patent Application No. 10-2019-0125309 filed on Oct. 10, 2019, the disclosure of which is incorporated herein by reference in its entirety.

TECHNICAL FIELD

The present disclosure relates to a battery module and a battery pack including the same, and more particularly to a battery module having improved temperature control performance, and a battery pack including the same.

BACKGROUND ART

In modern society, as portable devices such as mobile phones, notebook computers, camcorders and digital cameras have been daily used, the development of technologies in the fields related to mobile devices as described above has been activated. In addition, rechargeable batteries are used as a power source for electric vehicles (EV), hybrid electric vehicles (HEV), plug-in hybrid electric vehicles (P-HEV) and the like, in an attempt to solve air pollution and the like caused by existing gasoline vehicles using fossil fuel, and therefore, there is a growing need for development of the secondary battery.

Currently commercialized secondary batteries include nickel cadmium batteries, nickel hydrogen batteries, nickel zinc batteries, and lithium secondary batteries. Among them, lithium secondary batteries have come into the spotlight because they have advantages, for example, hardly exhibiting memory effects compared to nickel-based secondary batteries and thus being freely charged and discharged, and having very low self-discharge rate and high energy density.

Such lithium secondary batteries mainly use a lithium-based oxide and a carbonaceous material as a positive electrode active material and a negative electrode active material, respectively. A lithium secondary battery includes an electrode assembly in which a positive electrode plate and a negative electrode anode plate respectively coated with the positive electrode active material and the negative electrode active material are disposed with a separator being interposed between them, and an exterior material, i.e., battery case, which seals and accommodates the electrode assembly together with an electrolyte.

Generally, lithium secondary batteries may be classified based on the shape of the exterior material into a can type secondary battery in which the electrode assembly is embedded in a metal can, and a pouch-type secondary battery in which the electrode assembly is embedded in a pouch of an aluminum laminate sheet.

In the case of a secondary battery used for a small-sized device, two to three battery cells are arranged, but in the case of a secondary battery used for a medium to large-sized device such as an automobile, a battery module in which a large number of battery cells are electrically connected is used. In such a battery module, a plurality of battery cells are connected to each other in series or parallel to form a cell stack, thereby improving capacity and output. In addition, one or more battery modules may be mounted together with various control and protection systems such as a battery management system (BMS) and a cooling system to form a battery pack.

In this case, a plurality of battery cells generate heat during the charge or discharge process, and when the heat is not rapidly discharged in a dense state, it may accelerate deterioration of the battery cells and cause ignition, explosion or the like. Meanwhile, when the plurality of battery cells are exposed to a low temperature environment, they have the feature that charging and discharging do not proceed smoothly due to the increase in resistance, and the output voltage and current decrease sharply.

Therefore, for a battery module including a plurality of battery cells, it is necessary to control the temperature by cooling or heating the battery module depending on the external environment and the like. Here, there is a risk, such as a short circuit, in directly cooling or heating the electrode leads of the battery cells or the busbars connected to the electrode leads, and thus the cooling plate, in which an internal refrigerant circuit is formed, may be located on an opposite side to the electrode leads.

However, when the refrigerant leaks from an interior of the cooling plate, smooth cooling is difficult, and the leaked refrigerant may cause a danger such as a short circuit phenomenon. Further, since it is not a structure that directly cools the electrode leads, in which the actual heat is generated, there must be inevitably some limitation in the cooling efficiency.

DETAILED DESCRIPTION OF THE INVENTION

Technical Problem

Embodiments of the present disclosure have been made in an effort to solve the above-mentioned problems, and provide a battery module that includes a temperature control unit making contact with the electrode leads to enable effective cooling and heating, and a battery pack including the same.

However, the problem to be solved by the embodiments of the present disclosure is not limited to the above-described problems, and can be variously expanded within the scope of the technical idea included in the present disclosure.

Technical Solution

A battery module according to an embodiment of the present disclosure includes a battery cell stack, in which a plurality of battery cells comprising electrode leads, are stacked; a busbar connecting the electrode leads; and a temperature control unit that makes contact with the electrode leads, the temperature control unit includes a heat transfer member that makes contact with the electrode leads and a thermoelectric element capable of being heated and cooled, and the heat transfer member includes a metal layer and a metal oxide layer located between the metal layer and the electrode leads.

The metal layer may include aluminum, and the metal oxide layer may include an aluminum oxide.

The thermoelectric element may be cooled or heated depending on the direction of applied electric power.

The electrode leads may include welding portions bonded to the busbars or to the other electrode leads and a connecting portion connecting the welding portions and the battery cells, and at least one of the welding portions is configured such that one surface thereof may be bonded to the busbar or to the other electrode lead, and the other surface that is opposite to the one surface may make contact with the temperature control unit.

The temperature control unit may include a first bolt fixing the thermoelectric element to the heat transfer member.

The battery module may further include a busbar frame having slits through which the electrode leads pass, and the busbars may be mounted on the busbar frame.

The temperature control unit may include a second bolt fixing the heat transfer member to the busbar frame.

The temperature control unit may include a third bolt fixing the thermoelectric element and the heat transfer member to the busbar frame.

The electrode leads may be located at one side of the battery cell stack and at the other side that is opposite to the one side, and the busbar frame may be located at both the one side of the battery cell stack and the other side thereof.

Advantageous Effects

According to the embodiments of the present disclosure, the temperature control unit can make direct contact with the electrode leads through the metal oxide layer to enable effective cooling and heating of the battery module.

Meanwhile, the temperature control unit can be directly fixed through the metal layer and the metal oxide layer, and thus can be attached to make close contact with the electrode leads.

Meanwhile, since the temperature control unit includes the thermoelectric element, both cooling and heating of the battery module can be made depending on the direction of applied electric power.

BRIEF DESCRIPTION OF THE DRAWINGS

FIG. 1 is a perspective view illustrating a battery module according to an embodiment of the present disclosure;

FIG. 2 is a cross-sectional view taken along cutting line A-A of FIG. 1;

FIG. 3 is a cross-sectional view similar to FIG. 2, but illustrating a battery module according to another embodiment of the present disclosure;

FIG. 4 is a cross-sectional view similar to FIG. 2, but illustrating the battery module according to a comparative example of the present disclosure.

DETAILED DESCRIPTION OF THE EMBODIMENTS

Hereinafter, various embodiments of the present disclosure will be described in detail with reference to the accompanying figures so that those skilled in the art can easily implement them. The present disclosure may be modified in various different ways, and is not limited to the embodiments set forth herein.

Parts that are irrelevant to the description will be omitted to clearly describe the present disclosure, and like reference numerals designate like elements throughout the specification.

Further, in the figures, the size and thickness of each element are arbitrarily illustrated for convenience of description, and the present disclosure is not necessarily limited to those illustrated in the figures. In the figures, the thickness of layers, regions, etc. are exaggerated for clarity. In the figures, for convenience of description, the thicknesses of some layers and regions are shown to be exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the specification, when a part is referred to as "including" or "comprising" a certain component, it means that it can further include other components, without excluding the other components, unless otherwise stated.

Further, throughout the specification, when referred to as "planar", it means when a target portion is viewed from the top, and when referred to as "cross-sectional", it means when a target portion is viewed from the side of a cross section cut vertically.

FIG. 1 is a perspective view illustrating a battery module 100 according to an embodiment of the present disclosure.

Referring to FIG. 1, the battery module 100 according to the present embodiment may include a battery cell stack 200, in which a plurality of battery cells 210 including electrode leads 300, are stacked, a busbar 710 connecting the electrode leads 300, and a temperature control unit 400 that makes contact with the electrode leads 300.

The electrode leads 300 are located at one side and the other side of the battery cell stack 200, which are opposite to each other, and thus the temperature control unit 400 making contact with the electrode leads 300 may be located at at least one of one side and the other side of the battery cell stack 200, and may be located at both one side and the other side of the battery cell stack 200 as illustrated in FIG. 1. However, any one of the temperature control units 400 is illustrated to be spaced apart from the battery cell stack 200 in FIG. 1 for convenience of description.

Meanwhile, the busbar 710 connecting the electrode leads 300 may be mounted on a busbar frame 700. In detail, the busbar frame 700 is disposed on one side and the other side of the battery cell stack 200 depending on a direction in which the electrode leads 300 are located, and the electrode leads 300 pass through slits 720 disposed in the busbar frame 700 and a busbar slit 711 disposed in the busbars 710, and then is bent to be connected to the busbar 710.

If the electrode leads 300 and the busbars 710 are physically and electrically connected to each other, a connection method is not limited, but it is preferable that they are connected by welding.

FIG. 2 is a sectional view taken along cutting line A-A' of FIG. 1.

Referring to FIG. 2 together with FIG. 1, the temperature control unit 400 includes a heat transfer member 500 that makes contact with the electrode leads 300 and a thermoelectric element 600 capable of being heated and cooled.

The thermoelectric element 600 is an element that uses thermoelectric effect, which enables a reversible and direct energy conversion between temperature differences and electrical voltages. That is, the element may be both cooled and heated depending on the direction of applied electric power. Accordingly, the thermoelectric element 600 includes signal lines 610 connected to a battery management system (BMS) or a battery disconnected unit (BDU), and may be cooled or heated depending on the direction of electric power applied through the signal lines 610.

The heat transfer member 500 includes a metal layer 510 and a metal oxide layer 520 disposed on one surface of the metal layer 510. The metal oxide layer 520 is located between the metal layer 510, and the electrode leads 300, and makes direct contact with the electrode leads 300.

The metal layer 510 may include at least one of aluminum and copper, and the metal oxide layer 520 may include at least one of aluminum oxide ($Al_2O_3$), aluminum nitride (AlN) and boron nitride (BN). However, it is preferable that the metal layer 510 includes the aluminum and the metal oxide layer 520 includes the aluminum oxide. Moreover, the heat transfer member 500 may be a metal member in which one surface is anodized.

The metal layer 510 has an excellent thermal conductivity, so that both heat flow from the thermoelectric element 600 to the electrode leads 300 or heat flow in the opposite direction thereof may be smoothly transmitted.

The metal oxide layer 520 is a ceramic material having an electrical insulation performance and thus, can make direct contact with the electrode leads 300.

The thickness of the metal oxide layer 520 may be 10 μm to 1000 μm. When the thickness of the metal oxide layer 520 is less than 10 μm, there may be the danger of generating an electric current between the electrode leads 300 and the metal layer 510 because the electrical insulation performance is not sufficient. Meanwhile, if the thickness of the metal oxide layer 520 is more than 1000 μm, the heat transfer performance may deteriorate, which may interfere with the heat flow between the thermoelectric element 600 and the electrode leads 300.

The thickness of the metal layer 510 is not limited, but the thickness is preferably 1 mm or more in order to fix the heat transfer member 500 described hereinafter.

Meanwhile, as described above, the electrode leads 300 of the battery cells 210 may be bent after passing through the slits 720 and the busbar slits 711 of the busbar frame 700. As illustrated in FIG. 2, the electrode leads 300 may include welding portions 310 bonded to the busbars 710 or the other electrode leads and connecting portions 320 connecting the welding portions 310 and the battery cells.

Here, the at least one of the welding portions 310 is configured such that one surface thereof may be bonded to the other electrode lead, and the other surface that is opposite to the one surface may make contact with the temperature control unit 400, in particular, the metal oxide layer 520 of the heat transfer member 500.

Even though it is not illustrated in detail, the welding portions 310 making contact with the metal oxide layer 520 may be directly bonded to the busbar 710, rather than other electrode leads.

In the present embodiment, the heat transfer member 500 may make direct contact with the electrode leads 300 through the metal oxide layer 520. Since the electrode leads 300 intensively generating heat and the heat transfer member 500 make direct contact with each other, heat generated from the electrode leads 300 may be effectively discharged to the thermoelectric elements 600 through the heat transfer member 500.

In contrast, even when the battery module 100 is exposed to a low temperature environment and the thermoelectric element 600 generates heat, the principle may be similarly applied.

Meanwhile, FIG. 3 is a cross-sectional view illustrating a battery module according to another embodiment of the present disclosure, and FIG. 4 is a cross-sectional view illustrating the battery module according to a comparative example of the present disclosure.

Hereinafter, the advantage of the temperature control unit in the present disclosure in a fixed way as compared with the comparative example will be described with reference to FIGS. 2 to 4.

First, referring to FIG. 2, the temperature control unit 400 may include one or more first bolts 810 fixing the thermoelectric element 600 to the heat transfer member 500, and may include one or more second bolts 820 fixing the heat transfer member 500 to the busbar frame 700.

That is, the thermoelectric element 600 and the heat transfer member 500 may be directly fixed to the busbar frame 700 through the first bolts 810 and the second bolts 820.

The number of the first bolts 810 and the second bolts 820 are particularly not limited, but each of them is preferably provided as two or more for stable fixation.

Next, referring to FIG. 3, a temperature control unit 400a may include one or more third bolts 830 fixing the heat transfer member 500 to the busbar frame 700. To achieve this, the thermoelectric element 600a in FIG. 3 may extend such that the width thereof is the same as that of the heat transfer member 500, unlike the thermoelectric element 600 in FIG. 2.

The number of the third bolts 830 are particularly not limited, but they are preferably provided as two or more for stable fixation.

Meanwhile, referring to FIG. 4, the battery module according to a comparative example of the present disclosure may include an insulation sheet 50.

A configuration of electrode leads 30 including welding portions 31 and connectors 32, busbars 71, and a busbar frame 70 is the same as or similar to the battery modules of FIG. 2 and FIG. 3.

However, it is different from the embodiments of the present disclosure in that the insulation sheet 50, not the heat transfer member, is interposed between a thermoelectric element 60 and the electrode leads 30.

The insulation sheet 50 is a sheet-shaped member having thermal conductivity, together with electrical insulation, which corresponds to a medium material that causes heat to flow from the thermoelectric element 60 to the electrode leads 30 or in the opposite direction thereof.

However, the insulation sheet 50 has to be attached to minimize a fine air layer between the insulation sheet 50 and the electrode leads 30 or between the insulation sheet 50 and the thermoelectric element 60, but due to its nature, the insulation sheet 50 cannot be directly fixed.

Accordingly, as illustrated in FIG. 4, an additional attaching member 90 pressing the thermoelectric element 60 from the outside, and bolts 80 fixing the attaching member 90 to the busbar frame 70 are necessary. That is, unlike the embodiments of the present disclosure, which can directly fix temperature control units 400 and 400a, a comparative example utilizing the insulation sheet 50 requires an additional space for disposing the additional attaching member 90.

Further, the battery module may be used in transportation such as electric vehicles, hybrids, and the like, in which a mechanical vibration or an impact easily occurs from the outside, and the insulation sheet 50 may be easily separated or eliminated by a mechanical vibration or impact.

Further, even if the insulation sheet 50 contains materials having thermal conductivity, it may not have as much heat conductivity as a metal, and thus the thermal conductivity properties are relatively poor. In detail, an insulation sheet 50 may contain silicon oxide and the like, which is a fiber material, but their thermal conductivity is only several W/m·K levels. Meanwhile, in that the thermal conductivity of a metal oxide layer, such as an aluminum oxide and the like, is 20 W/m·K levels, and that of metal layers, such as aluminum and the like, are hundreds of W/m·K level, the thermal conductivity properties are excellent.

Further, since the air layer may be formed to some extent between the thermoelectric element 60 and the insulation sheet 50, heat transfer is limited.

Unlike the insulation sheet 50, in the temperature control units 400 and 400a of the present embodiment, the heat transfer member 500 may be directly fixed, so that the temperature control units do not need an additional member and are more stable in a mechanical vibration or impact from the outside.

Further, the metal layer 510 and the thin metal oxide layer 520 are included therein, and thus the thermal conductivity properties may be excellent.

Further, the thermoelectric elements 600 and 600a are directly fixed to the heat transfer member 500 by the first bolts 810 or the third bolts 830, and thus they can be stably fixed and be attached to each other without the air layer therebetween.

Meanwhile, one or more battery modules may be mounted together with various control and protection systems such as a battery management system (BMS) and a cooling system to form a battery pack.

The battery module or the battery pack may be applied to various devices. These devices may be used in vehicles such as an electric bicycle, an electric vehicle, a hybrid vehicle, but the present disclosure is not limited thereto and can be applied to various devices that can use the battery module and the battery pack including the same, which also belongs to the scope of the present disclosure.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

100: battery module
200: battery cell stack
300: electrode lead
400: temperature control unit
500: heat transfer member
510: metal layer
520: metal oxide layer
600: thermoelectric element
700: busbar frame
710: busbar

The invention claimed is:

1. A battery module comprising:
a battery cell stack, in which a plurality of battery cells each comprising respective electrode leads, are stacked;
a busbar connecting a plurality of the electrode leads together; and
a temperature control unit arranged to contact the plurality of electrode leads,
wherein the temperature control unit comprises a thermoelectric element capable of being heated and cooled and a heat transfer member, the heat transfer member arranged to contact the electrode leads, and the heat transfer member being positioned between the electrode leads and the thermoelectric element so as to space the thermoelectric element away from the electrode leads such that
the thermoelectric element does not directly contact the electrode leads, and
wherein the heat transfer member comprises a metal layer and a metal oxide layer, the metal oxide layer being disposed on a surface of the metal layer between the metal layer and the electrode leads such that the metal oxide layer is in direct contact with the electrode leads while the metal layer is not in direct contact with the electrode leads.

2. The battery module of claim 1, wherein
the metal layer comprises aluminum, and
the metal oxide layer comprises an aluminum oxide.

3. The battery module of claim 1, wherein
the thermoelectric element is configured to be cooled or heated depending on the direction of applied electric power.

4. The battery module of claim 1, wherein
the electrode leads each comprise a welding portion and a connecting portion, the welding portion being bonded either to the busbar or to at least one other one of the electrode leads, and the connecting portion connecting the welding portion to a respective one of the battery cells, and
wherein at least one of the welding portions is arranged such that one surface thereof is bonded either to the busbar or to the at least one other one of the electrode leads, and another surface that is opposite to the one surface contacts the temperature control unit.

5. The battery module of claim 1, wherein the temperature control unit comprises a first bolt fixing the thermoelectric element to the heat transfer member.

6. The battery module of claim 1, further comprising a busbar frame having slits through which the plurality of electrode leads pass,
wherein the busbars are mounted on the busbar frame.

7. The battery module of claim 6, wherein
the temperature control unit comprises a second bolt fixing the heat transfer member to the busbar frame.

8. The battery module of claim 6, wherein
the temperature control unit comprises a third bolt fixing the thermoelectric element and the heat transfer member to the busbar frame.

9. The battery module of claim 6, wherein
the electrode leads of each of the plurality of battery cells extend from the respective battery cell on both a first side and a second side of the battery cell stack, the second side being opposite to the first side, and
the busbar frame is located at both the first side and the second side of the battery cell stack.

10. A battery pack comprising one or more battery modules of claim 1.

11. The battery module of claim 7, wherein the temperature control unit comprises a first bolt fixing the thermoelectric element to the heat transfer member.

* * * * *